United States Patent
Song

(10) Patent No.: US 11,110,978 B2
(45) Date of Patent: Sep. 7, 2021

(54) SUSPENSION APPARATUS AND SPECIALIZED VEHICLE INCLUDING THE SAME

(71) Applicant: HANWHA DEFENSE CO., LTD., Changwon-si (KR)

(72) Inventor: Ho Nam Song, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 95 days.

(21) Appl. No.: 16/050,918

(22) Filed: Jul. 31, 2018

(65) Prior Publication Data

US 2019/0168830 A1 Jun. 6, 2019

(30) Foreign Application Priority Data

Dec. 1, 2017 (KR) .......................... 10-2017-0164329

(51) Int. Cl.
*B62D 55/116* (2006.01)
*B62D 55/02* (2006.01)
(Continued)

(52) U.S. Cl.
CPC .............. *B62D 55/116* (2013.01); *B60F 3/00* (2013.01); *B60G 17/016* (2013.01); *B62D 55/02* (2013.01);
(Continued)

(58) Field of Classification Search
CPC .......... B60F 3/00; B60F 3/003; B60G 17/016; B60G 2600/04; B60G 2500/11;
(Continued)

(56) References Cited

U.S. PATENT DOCUMENTS 4,079,963 A * 3/1978 Siorek .................. B60G 17/044
267/64.16
5,957,218 A 9/1999 Noonan et al.
(Continued)

FOREIGN PATENT DOCUMENTS

KR 10-0192559 B1 6/1999
KR 10-0369390 B1 1/2003
(Continued)

OTHER PUBLICATIONS

S. Sridharand N.S. Sekar, "Optimisation of Kinematics for Tracked Vehicle Hydro Gas Suspension System", Nov. 2006, Defense Science Journal, vol. 56, No. 5, pp. 743-752 (Year: 2006).*

*Primary Examiner* — Tony H Winner
*Assistant Examiner* — Felicia L. Brittman
(74) *Attorney, Agent, or Firm* — Sughrue Mion, PLLC

(57) ABSTRACT

Provided herein are a suspension apparatus and a specialized vehicle including the same. The suspension apparatus includes a crankshaft fixed to a vehicle body, a housing rotatably connected to the crankshaft, a first damping portion arranged in the housing and having a damping fluid accommodated in the first damping portion, an amount of the damping fluid in the first damping portion being adjusted according to an external force applied to the vehicle body, a second damping portion arranged in the housing, connected to the first damping portion such that the damping fluid moves between the first damping portion and the second damping portion, and including: a first space accommodating a compressed gas; and a second space accommodating the damping fluid, the first space facing the second space; and a rotational force applier arranged in the housing and configured to apply a rotational force to the housing by adjusting an amount of a working fluid in the rotational force applier.

20 Claims, 14 Drawing Sheets

(51) Int. Cl.
*B62D 55/112* (2006.01)
*B60G 17/016* (2006.01)
*B62D 55/06* (2006.01)
*F41H 7/00* (2006.01)
*B60F 3/00* (2006.01)

(52) U.S. Cl.
CPC ............ B62D 55/06 (2013.01); B62D 55/112 (2013.01); F41H 7/00 (2013.01); *B60G 2300/28* (2013.01); *B60G 2300/32* (2013.01); *B60G 2400/0516* (2013.01); *B60G 2500/10* (2013.01); *B60G 2500/11* (2013.01); *B60G 2600/04* (2013.01); *B60G 2600/20* (2013.01)

(58) Field of Classification Search
CPC ............ B60G 2500/10; B60G 2600/20; B60G 2300/28; B60G 2300/32; B60G 2400/0516; B62D 55/116; B62D 55/112; B62D 55/06; B62D 55/02; F41H 7/02; F41H 7/00

USPC ......... 180/9.52; 280/5.5, 5.51, 6.15, 124.129
See application file for complete search history.

(56) References Cited

U.S. PATENT DOCUMENTS

| | | |
|---|---|---|
| 7,314,394 B2 | 1/2008 | Darby |
| 7,954,583 B2 | 6/2011 | Coers et al. |
| 7,963,537 B2 * | 6/2011 | Stockford .............. B60G 3/145 180/24 |
| 2013/0228404 A1 * | 9/2013 | Marking ................. F16F 9/065 188/266.2 |
| 2015/0290991 A1 * | 10/2015 | Cox ....................... B60G 13/06 188/269 |

FOREIGN PATENT DOCUMENTS

| | | |
|---|---|---|
| KR | 10-1706212 B1 | 2/2017 |
| WO | 2017/099312 A1 | 6/2017 |

\* cited by examiner

SUSPENSION APPARATUS AND SPECIALIZED VEHICLE INCLUDING THE SAME

CROSS-REFERENCE TO THE RELATED APPLICATION

This application claims priority from Korean Patent Application No. 10-2017-0164329, filed on Dec. 1, 2017, in the Korean Intellectual Property Office, the disclosure of which is incorporated herein by reference in its entirety.

BACKGROUND

1. Field

Apparatuses consistent with exemplary embodiments relate to an apparatus, and more particularly, to a suspension apparatus and a specialized vehicle including the same.

2. Description of the Related Art

There are many types of specialized vehicles which include a caterpillar track. For example, a tank is one of those specialized vehicles including a caterpillar track. These specialized vehicles are capable of moving on land or water to accomplish a mission. When operating on land, a specialized vehicle can achieve damping via a suspension apparatus connected to a caterpillar track, and when moving on water, the suspension apparatus can be accommodated inside the specialized vehicle. Here, the suspension apparatus may be formed in various ways. For example, the suspension apparatus may include a structure for damping and a motor connected to a vehicle body to rotate the suspension apparatus. In another exemplary embodiment, the suspension apparatus may include a structure for damping and a housing structure configured to accommodate the suspension apparatus in the specialized vehicle by using the housing structure for damping and a ground reaction force.

In the case in which the suspension apparatus includes a structure for damping and a motor for rotating the suspension apparatus, additional power may be required to drive the motor, and a space for the motor may be required. In addition, it may not be possible to separately accommodate a suspension apparatus, which does not include a motor, in a specialized vehicle on water on which no ground reaction force acts.

SUMMARY

One or more exemplary embodiments include a suspension apparatus and a specialized vehicle including the same.

Additional aspects will be set forth in part in the description which follows and, in part, will be apparent from the description, or may be learned by practice of the presented embodiments.

According to an aspect of an exemplary embodiment, there is provided a suspension apparatus including: a crankshaft fixed to a vehicle body; a housing rotatably connected to the crankshaft; a first damping portion arranged in the housing and having a damping fluid accommodated therein, wherein an amount of the damping fluid is adjusted according to an external force applied to the housing; a second damping portion arranged in the housing, connected to the first damping portion such that the damping fluid is shared with the first damping portion, and configured to accommodate a compressed gas in a space such that the compressed gas faces the damping fluid, the space being different from a space in which the damping fluid is accommodated; and a rotational force applier arranged in the housing and configured to apply a rotational force to the housing by adjusting an amount of a working fluid.

In addition, the suspension apparatus may further include an accumulator connected to the rotational force applier and configured to adjust the amount of the working fluid.

In addition, the suspension apparatus may further include a first directional control valve configured to selectively connect the rotational force applier to the accumulator.

The suspension apparatus may further include a spool valve arranged in the housing, connected to the first damping portion and the second damping portion, and configured to selectively block the damping fluid from being discharged to the outside and supplied from the outside.

In addition, the suspension apparatus may further include a pump configured to supply a fluid to at least one of the first damping portion, the second damping portion, the rotational force applier, and the spool valve.

In addition, the suspension apparatus may further include a fluid storage portion connected to at least one of the pump, the first damping portion, the second damping portion, the rotational force applier, and the spool valve, and configured to store a fluid.

In addition, the suspension apparatus may further include a second directional control valve configured to selectively connect the pump to one of the rotational force applier and the fluid storage portion.

In addition, the suspension apparatus may further include a third directional control valve configured to selectively connect the pump to the first damping portion and selectively connect the pump to the second damping portion or selectively connect the pump to the fluid storage portion.

In addition, the suspension apparatus may further include a fourth directional control valve configured to selectively connect the pump to one of the spool valve and the fluid storage portion.

According to an aspect of another exemplary embodiment, there is provided a suspension apparatus including: a crankshaft fixed to a vehicle body; a housing rotatably connected to the crankshaft; a first damping portion arranged in the housing and having a damping fluid accommodated therein, wherein an amount of the damping fluid is adjusted according to an external force applied to the housing; a second damping portion arranged in the housing such that the second damping portion faces the first damping portion, connected to the first damping portion such that the damping fluid is shared with the first damping portion, and configured to accommodate a compressed gas in a space such that the compressed gas faces the damping fluid, the space being different from a space in which the damping fluid is accommodated; and a rotational force applier arranged in the housing and configured to apply a rotational force to the housing by adjusting an amount of a working fluid.

In addition, the suspension apparatus may further include an accumulator connected to the rotational force applier and configured to adjust the amount of the working fluid.

In addition, the suspension apparatus may further include a spool valve arranged in the housing, connected to the first damping portion and the second damping portion, and configured to selectively block the damping fluid from being discharged to the outside and supplied from the outside.

In addition, the suspension apparatus may further include a pump configured to supply a fluid to at least one of the first damping portion, the second damping portion, the rotational force applier, and the spool valve.

In addition, the suspension apparatus may further include a fluid storage portion connected to at least one of the pump, the first damping portion, the second damping portion, the rotational force applier, and the spool valve, and configured to store a fluid.

According to an aspect of another exemplary embodiment, there is provided a specialized vehicle includes: a vehicle body; a caterpillar track connected to the vehicle body, configured to move the vehicle body, and including at least one road wheel and a track configured to surround the at least one road wheel; and a suspension apparatus connected to the at least one road wheel and configured to accommodate or deploy the at least one road wheel in the vehicle body, wherein the suspension apparatus includes: a crankshaft fixed to the vehicle body; a housing rotatably connected to the crankshaft; a first damping portion arranged in the housing and having a damping fluid accommodated therein, wherein an amount of the damping fluid is adjusted according to an external force applied to the housing; a second damping portion arranged in the housing, connected to the first damping portion such that the damping fluid is shared with the first damping portion, and configured to accommodate a compressed gas in a space such that the compressed gas faces the damping fluid, the space being different from a space in which the damping fluid is accommodated; and a rotational force applier arranged in the housing and configured to apply a rotational force to the housing by adjusting an amount of a working fluid.

In addition, the suspension apparatus may further include an accumulator connected to the rotational force applier and configured to adjust the amount of the working fluid.

In addition, the suspension apparatus may further include a spool valve arranged in the housing, connected to the first damping portion and the second damping portion, and configured to selectively block the damping fluid from being discharged to the outside and supplied from the outside.

In addition, the suspension apparatus may further include a pump configured to supply a fluid to at least one of the first damping portion, the second damping portion, the rotational force applier, and the spool valve.

In addition, the suspension apparatus may further include a fluid storage portion connected to at least one of the pump, the first damping portion, the second damping portion, the rotational force applier, and the spool valve, and configured to store a fluid.

According to an aspect of another exemplary embodiment, there is provided a suspension apparatus including: a crankshaft fixed to a vehicle body; a housing rotatably connected to the crankshaft; a first damping portion arranged in the housing and having a damping fluid accommodated in the first damping portion, an amount of the damping fluid in the first damping portion being adjusted according to an external force applied to the vehicle body; a second damping portion arranged in the housing, connected to the first damping portion such that the damping fluid moves between the first damping portion and the second damping portion, and including: a first space accommodating a compressed gas; and a second space accommodating the damping fluid, the first space facing the second space; and a rotational force applier arranged in the housing and configured to apply a rotational force to the housing by adjusting an amount of a working fluid in the rotational force applier.

The suspension apparatus may further include an accumulator connected to the rotational force applier and configured to adjust the amount of the working fluid in the rotational force applier.

The suspension apparatus may further include a spool valve arranged in the housing, connected to the first damping portion and the second damping portion, and configured to selectively block the damping fluid from being discharged to or supplied from an exterior of the housing.

The suspension apparatus may further include a pump configured to supply a fluid to at least one of the first damping portion, the second damping portion, the rotational force applier, and the spool valve.

The suspension apparatus may further include a fluid storage portion connected to at least one of the pump, the first damping portion, the second damping portion, the rotational force applier, and the spool valve, and configured to store the fluid.

The suspension apparatus may further include a first directional control valve configured to selectively connect the rotational force applier to the accumulator; a second directional control valve configured to selectively connect the pump to one of the rotational force applier and the fluid storage portion; a third directional control valve configured to selectively connect the pump to the first damping portion and the second damping portion or selectively connect the pump to the fluid storage portion; and a fourth directional control valve configured to selectively connect the pump to one of the spool valve and the fluid storage portion.

According to an aspect of another exemplary embodiment, there is provided a suspension apparatus including: a crankshaft fixed to a vehicle body; a housing rotatably connected to the crankshaft; a first damping portion provided in the housing and comprising a space for accommodating a damping fluid, a size of the space accommodating the damping fluid being adjusted according to an external force applied to the vehicle body; a second damping portion provided in the housing, the second damping portion being adjacent to the first damping portion, communicating with the first damping portion via a channel to share the damping fluid with the first damping portion, and including: a first chamber accommodating a compressed gas; and a second chamber accommodating the damping fluid, the first chamber and the second chamber facing each other; and a rotational force applier provided in the housing and configured to apply a rotational force to the housing by adjusting an amount of a working fluid in the rotational force applier.

The suspension apparatus may further include an accumulator connected to the rotational force applier and configured to adjust the amount of the working fluid in the rotational force applier.

The suspension apparatus may further include a spool valve arranged in the housing, connected to the first damping portion and the second damping portion, and configured to selectively block the damping fluid from being discharged to or supplied from an exterior of the housing.

The suspension apparatus may further include a pump configured to supply a fluid to at least one of the first damping portion, the second damping portion, the rotational force applier, and the spool valve.

The suspension apparatus may further include a fluid storage portion connected to at least one of the pump, the first damping portion, the second damping portion, the rotational force applier, and the spool valve, and configured to store the fluid.

According to an aspect of another exemplary embodiment, there is provided a specialized vehicle includes: a vehicle body; a caterpillar track connected to the vehicle body, configured to move the vehicle body, and including: at least one road wheel; and a track surrounding the at least one road wheel; and a suspension apparatus provided in the vehicle body and connected to the at least one road wheel, wherein the suspension apparatus may include: a crankshaft fixed to the vehicle body; a housing rotatably connected to the crankshaft; a first damping portion provided in the housing and having a first space to accommodate a damping fluid in the first damping portion; a second damping portion provided adjacent to the first damping portion in the housing, connected to the first damping portion to share the damping fluid with the first damping portion, and including: a second space accommodating a compressed gas in the second damping portion; and a third space accommodating the damping fluid in the second damping portion, an amount of the damping fluid in the first and second damping portions being adjusted according to an external force applied to the at least one road wheel; and a rotational force applier provided adjacent to the second damping portion in the housing and configured to apply a rotational force to the housing by adjusting an amount of a working fluid in the rotational force applier.

The suspension apparatus may further include an accumulator connected to the rotational force applier and configured to adjust the amount of the working fluid in the rotational force applier.

The suspension apparatus may further include a spool valve arranged in the housing, connected to the first damping portion and the second damping portion, and configured to selectively block the damping fluid from being discharged to or supplied from an exterior of the housing.

The suspension apparatus may further include a pump configured to supply a fluid to at least one of the first damping portion, the second damping portion, the rotational force applier, and the spool valve.

The suspension apparatus may further include a fluid storage portion connected to at least one of the pump, the first damping portion, the second damping portion, the rotational force applier, and the spool valve and configured to store the fluid.

The suspension apparatus may further include: a first directional control valve configured to selectively connect the rotational force applier to the accumulator; a second directional control valve configured to selectively connect the pump to one of the rotational force applier and the fluid storage portion; a third directional control valve configured to selectively connect the pump to the first damping portion and the second damping portion or selectively connect the pump to the fluid storage portion; and a fourth directional control valve configured to selectively connect the pump to one of the spool valve and the fluid storage portion.

The specialized vehicle may further include a controller configured to control the first, second, third and fourth directional control valves based on a drive mode of the specialized vehicle.

In response to the controller determining that the specialized vehicle is operating in a land mode, the controller may be configured to turn off power of the first, second, third and fourth directional control valves. In response to the controller receiving an input to operate the specialized vehicle in a water mode while driving in the land mode, the controller may be configured to apply power to the first, second, third and fourth directional control valves.

In response to the controller receiving an input to operate the specialized vehicle in a land mode while driving in a water mode, the controller may be configured to apply power to only the first directional control valve.

BRIEF DESCRIPTION OF THE DRAWINGS

The above and/or other aspects of the disclosure will become apparent and more readily appreciated from the following description of the exemplary embodiments, taken in conjunction with the accompanying drawings in which.

DETAILED DESCRIPTION

Figure 1:
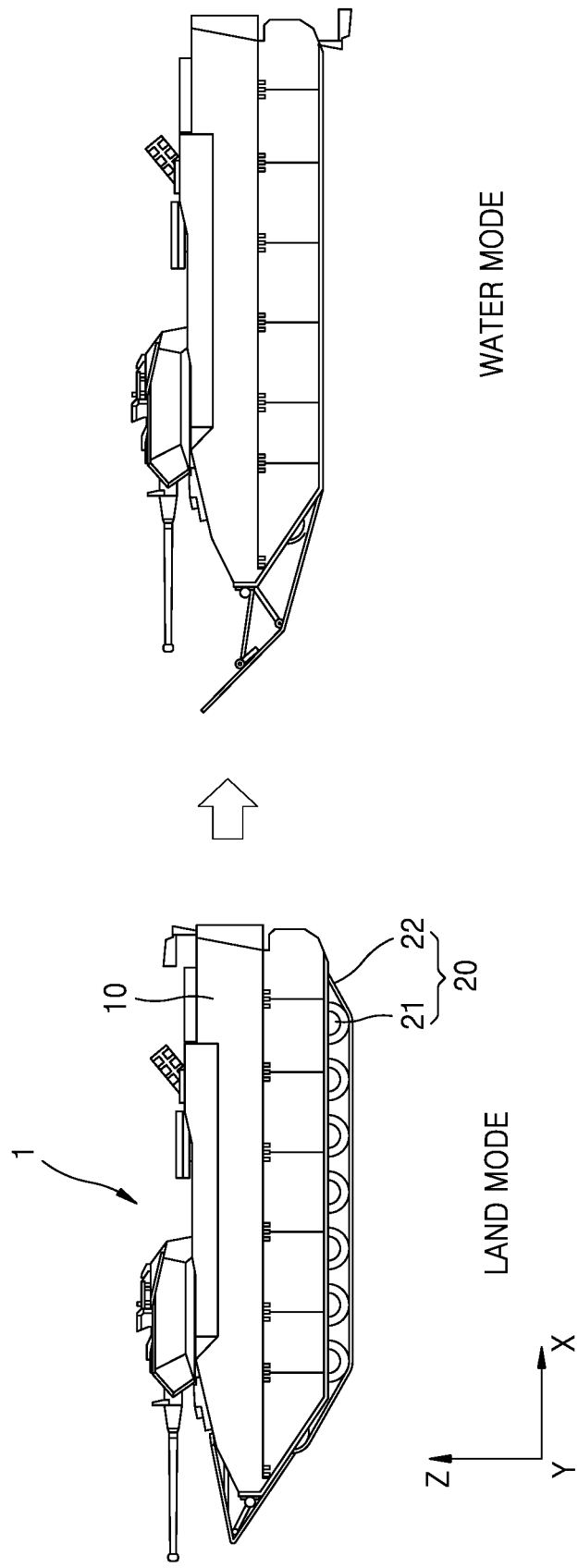
FIG. 1 is a front view illustrating a change in an operational state of a specialized vehicle according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

The present disclosure will become apparent from the exemplary embodiments, which will be described in detail, with reference to the accompanying drawings. The present disclosure may, however, be embodied in many different forms and should not be construed as being limited to the exemplary embodiments set forth herein. Rather, these exemplary embodiments are provided so that this disclosure will be thorough and complete, and will fully convey the scope of the present disclosure to those skilled in the art. In addition, the present disclosure is defined only by the scope of the appended claims. Meanwhile, terms used in the present specification are intended to explain exemplary embodiments and are not intended to limit the present disclosure. As used herein, the singular forms are intended to include the plural forms as well, unless the context clearly indicates otherwise. The terms "comprises" and/or "comprising," when used in this specification, specify the presence of stated elements, steps, operations, and/or components, but do not preclude the presence or addition of one or more other elements, steps, operations, and/or components. The terms such as "first," "second," and the like may be used to describe various components, but such components must not be limited by the above terms. These terms are used only to distinguish one component from another.

Specialized vehicles according to exemplary embodiments of the present disclosure may be moving vehicles including caterpillar tracks. In this case, specialized vehicles may be used for military purposes, and may also be used for the construction field. Hereinafter, for the convenience of explanation, a case in which the specialized vehicle is an amphibious armored vehicle will be mainly described in detail.

Figure 2:
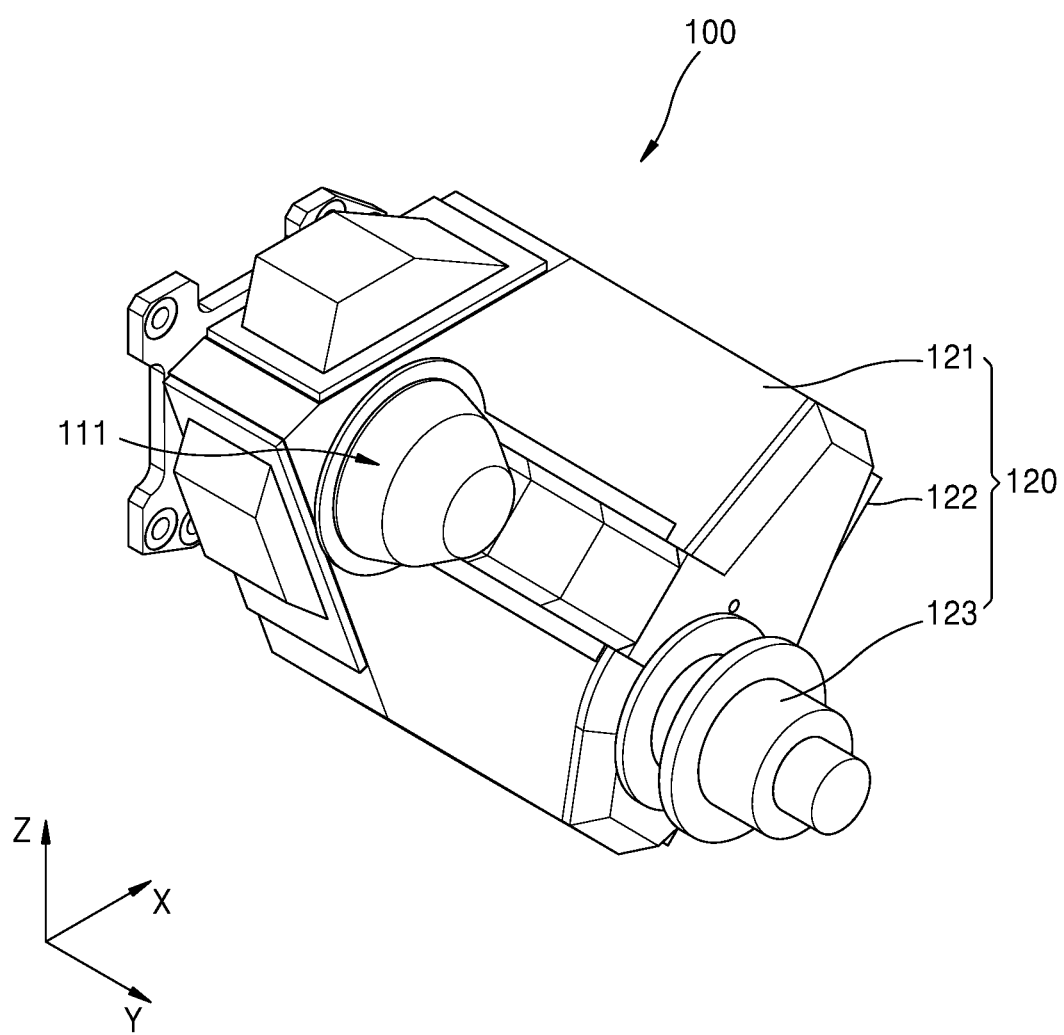
FIG. 2 a perspective view illustrating a suspension apparatus of the specialized vehicle of FIG. 1, according to an exemplary embodiment.
Figure 3:
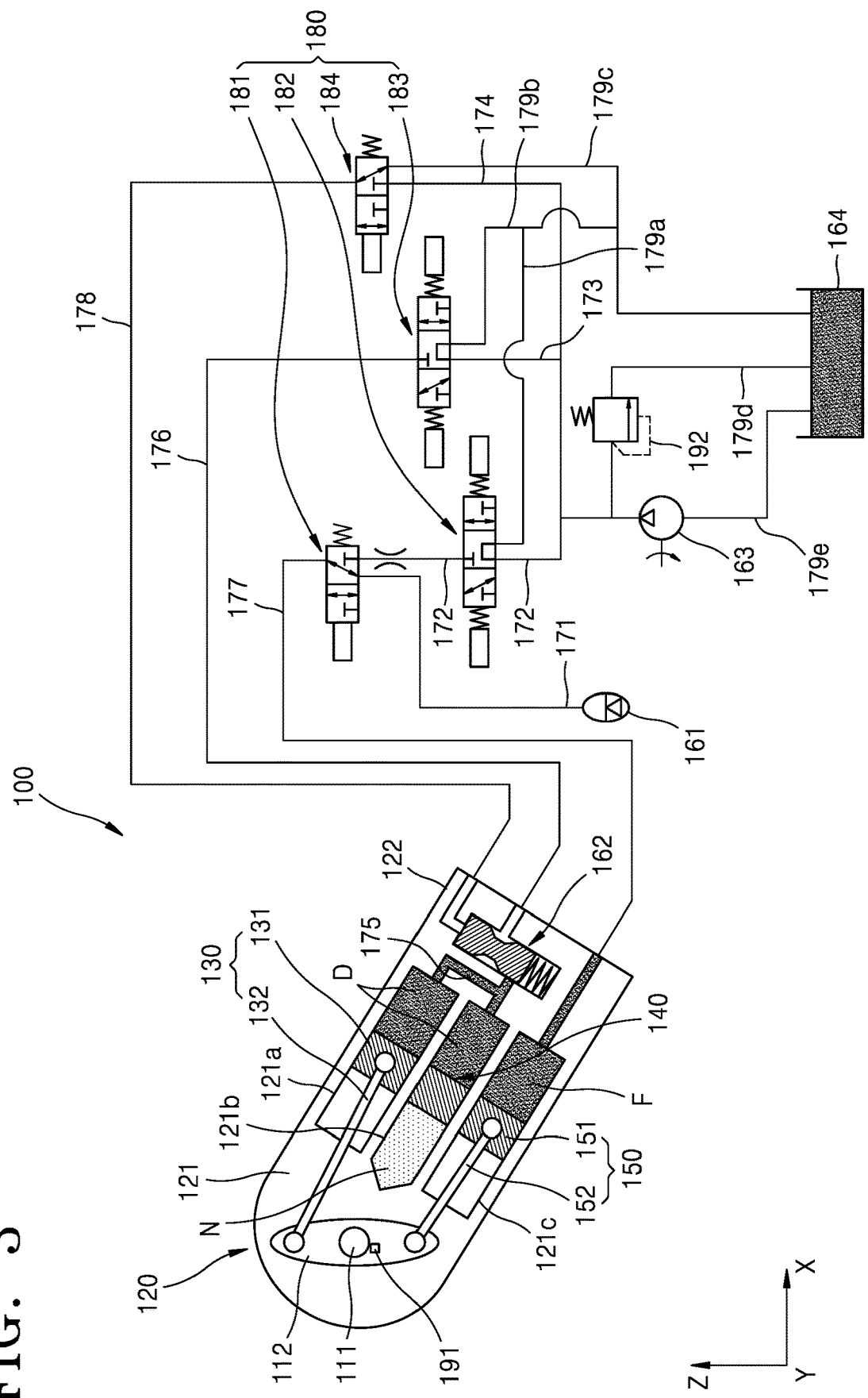
FIG. 3 is a conceptual view illustrating the suspension apparatus of FIG. 2.

FIG. 1 is a front view illustrating a change in an operational state of a specialized vehicle 1 (an amphibious vehicle) according to an exemplary embodiment. FIG. 2 is a perspective view illustrating a suspension apparatus 100 of the specialized vehicle 1 of FIG. 1, according to an exemplary embodiment. FIG. 3 is a conceptual view illustrating the suspension apparatus 100 of FIG. 2.

Referring to FIGS. 1 to 3, the specialized vehicle 1 may include a vehicle body 10, a caterpillar track 20, and a suspension apparatus 100. Various heavy weapons such as a gun barrel, an automatic rifle, and the like may be arranged in the vehicle body 10.

The caterpillar track 20 may include a plurality of road wheels 21 and a track 22 configured to surround the road wheels 21. In addition, the caterpillar track 20 may include a roller (not shown) for guiding the movement of the track 22.

The suspension apparatus 100 shown in FIG. 2 may be rotatably installed in the vehicle body 10. The suspension apparatus 100 may connect the vehicle body 10 by connecting with each road wheel 21. By being connected to each road wheel 21, the suspension apparatus 100 may perform damping according to an external force applied to each road wheel 21. In addition, the suspension apparatus 100 may perform the deployment and accommodation of each road wheel 21.

The suspension apparatus 100 may include a crankshaft 111, a housing 120, a first damping portion 130, a second damping portion 140, a rotational force applier 150, an accumulator 161, a spool valve 162, a pump 163, a fluid storage portion 164, a directional control valve 180, an angle sensor 191, and a bypass valve 192.

The crankshaft 111 may be fixed to the vehicle body 10. At this time, a separate pivot member 112 may be installed at and connected to the crankshaft 111.

The housing 120 may be rotatably installed at the crankshaft 111. The housing 120 may include a main housing 121 having a space for storing a fluid, a gas, and the like therein and a fluid manifold 122 connected to the main housing 121. The main housing 121 may be provided therein with a first space 121a, a second space 121b, and a third space 121c. In this case, the main housing 121 may be coupled with the fluid manifold 122. In addition, the fluid manifold 122 may be provided with a flow channel (not shown) connected to an inner space of the main housing 121 to allow a fluid to flow therebetween. The housing 120 may include a spindle 123 connected to the main housing 121 and having the road wheel 21 rotatably installed thereat.

The first damping portion 130 may be installed in the main housing 121. The first damping portion 130 may be installed in the first space 121a and include a first piston 131 configured to be movable along the first space 121a. The first piston 131 may divide the first space 121a into two regions, and a damping fluid D may be accommodated in one of the two regions of the first space 121a. The damping fluid D may move from the first space 121a to the second space 121b and may be discharged to the outside or supplied from the outside, through the fluid manifold 122. The first damping portion 130 may also include a first conrod 132 rotatably connected to the pivot member 112. The first conrod 132 may be rotatable about the pivot member 112 as the main housing 121 rotates.

The second damping portion 140 may include a second piston (not shown) arranged in the second space 121b. The second piston may divide the second space 121b into two regions similar to the first space 121a being divided into two regions. The damping fluid D may be stored in one of the two regions of the second space 121b which are divided by the second piston, and nitrogen gas N may be accommodated and stored in the other of the two regions of the second space 121b. The damping fluid D may freely move between the first space 121a and the second space 121b through a connecting flow channel 175 which connects the second space 121b and the first space 121a to allow a fluid to flow therebetween. In addition, the connecting flow channel 175 may be connected to a first transfer flow channel 176 selectively opened or blocked by the spool valve 162 to guide the damping fluid D to the outside or guide the damping fluid D supplied from the outside into the connecting flow channel 175.

The rotational force applier 150 may be installed in the third space 121c to rotate the main housing 121 according to the supply of a working fluid F. In this regard, the rotational force applier 150 may include a third piston 151 slidably arranged in the third space 121c, and a second conrod 152 that connects the third piston 151 to the pivot member 112 and rotatably connected to the third piston 151 and the pivot member 112. The third piston 151 may divide the third space 121c into two regions, and the working fluid F, which generates a force needed for the rotation of the main housing 121, may be accommodated in one of the two regions of the third space 121c. In addition, the third space 121c may be connected to the outside via a second transfer flow channel 177.

The accumulator 161 may be connected to the third space 121c via the second transfer flow channel 177. The accumulator 161 may adjust the amount of the working fluid F according to the movement of the third piston 151. In particular, the accumulator 161 may adjust the amount of the working fluid F when the main housing 121 performs damping movement instead of rotation. The accumulator 161 may be connected to the second transfer flow channel 177 via the first flow channel 171 as shown in FIG. 3.

The spool valve 162 may be installed in the fluid manifold 122. The spool valve 162 may selectively open or close the first transfer flow channel 176. Here, the fluid manifold 122 may be provided with a supply flow channel 178 for allowing a fluid supplied from the outside to move therethrough to operate the spool valve 162. The spool valve 162 may open the first transfer flow channel 176 when a fluid is supplied from the supply flow channel 178, and the spool valve 162 may close the first transfer flow channel 176 when the fluid supplied from the supply flow channel 178 is blocked.

The pump 163 may be connected to the fluid storage portion 164 to supply a fluid of the fluid storage portion 164 to at least one of the first damping portion 130, the second damping portion 140, and the rotational force applier 150. At this time, the pump 163 may be arranged at a second flow channel 179e.

A bypass flow channel 179*d* may be connected to the second flow channel 179*e*. In this case, the bypass flow channel 179*d* may be provided with the bypass valve 192 configured to operate according to an operating pressure of the pump 163.

The second flow channel 179*e* may be connected to three branch flow channels 172, 173 and 174. For example, the branch flow channels 172, 173 and 174 are connected to the second flow channel 179*e*, and may include a first branch flow channel 172 selectively connected to the second transfer flow channel 177. In addition, the branch flow channels are connected to the second flow channel 179*e*, and may include a second branch flow channel 173 selectively connected to the first transfer flow channel 176. The branch flow channels are selectively connected to the supply flow channel 178, and may include a third branch flow channel 174 connected to the second flow channel 179*e*.

The directional control valve 180 may change a flow path of the fluid according to various controls. More specifically, the directional control valve 180 may block a fluid supplied to at least one of the first damping portion 130, the second damping portion 140, and the rotational force applier 150 or block a fluid discharged from at least one of the first damping portion 130, the second damping portion 140, and the rotational force applier 150. In this case, the directional control valve 180 may take a form of a solenoid valve.

The directional control valve 180 may include a first directional control valve 181 which selectively connects the accumulator 161 to the second transfer flow channel 177 or selectively connects the first branch flow channel 172 to the second transfer flow channel 177.

The directional control valve 180 may be installed at the first branch flow channel 172 and include a second directional control valve 182 that selectively opens or closes the first branch flow channel 172. In this regard, the second directional control valve 182 may be connected to the first directional control valve 181 by a portion of the first branch flow channel 172.

The directional control valve 180 may be arranged between the first transfer flow channel 176 and the second branch flow channel 173 and include a third directional control valve 183 which selectively connects the first transfer flow channel 176 to the second branch flow channel 173.

The directional control valve 180 may include a fourth directional control valve 184 which selectively connects the supply flow channel 178 to a third branch flow channel 174.

The second directional control valve 182 may be connected to the fluid storage portion 164 via a first return flow channel 179*a*. In an exemplary embodiment, the second directional control valve 182 may connect the second transfer flow channel 177 to the first return flow channel 179*a* or connect the first branch flow channel 172 to the first return flow channel 179*a*.

The third directional control valve 183 may be connected to the fluid storage portion 164 via a second return flow channel 179*b*. In an exemplary embodiment, the third directional control valve 183 may connect the first transfer flow channel 176 to the second return flow channel 179*b* or connect the second branch flow channel 173 to the second return flow channel 179*b*.

The fourth directional control valve 184 may be connected to the fluid storage portion 164 via a third return flow channel 179*c*. At this time, in some exemplary embodiments, the fourth directional control valve 184 may connect the supply flow channel 178 to the third return flow channel 179*c*.

The first return flow channel 179*a*, the second return flow channel 179*b*, and a third return flow channel 179*c* may be each independently connected to the fluid storage portion 164 as shown in FIG. 3. In another exemplary embodiment, the first return flow channel 179*a*, the second return flow channel 179*b*, and the third return flow channel 179*c* may be connected to the fluid storage portion 164 via a single flow channel. Hereinafter, for the convenience of explanation, a case in which the first, second and third return flow channels 179*a*, 179*b* and 179*c* are connected to the fluid storage portion 164 via a single flow channel will be mainly described in detail.

The angle sensor 191 may be installed on the crankshaft 111 to measure a position angle of the housing 120. The angle sensor 191 may measure the position angle of the housing 120 based on a degree to which a point of the housing 120 rotates about a point of the crankshaft 111.

Meanwhile, the suspension apparatus 100 may further include a controller 500 (FIG. 14) in addition to the above-described components. The controller 500 may take various forms such as a circuit board, a personal computer, a notebook, a portable terminal, and the like. The controller 500 may control the accumulator 161, the pump 163, the directional control valve 180 (including the first, second, third and fourth control valves 181, 182, 183 and 184), and the like. The controller 500 may be connected to the accumulator 161, the pump 163, the directional control valve 180, and the like by wire or may be connected wirelessly.

The controller 500 may be implemented as variety numbers hardware and/or software configurations executing certain functions. For example, the controller 500 may denote a data processing device built in hardware, and includes a physically structured circuit for executing functions expressed as codes or commands included in a program.

Figure 14:
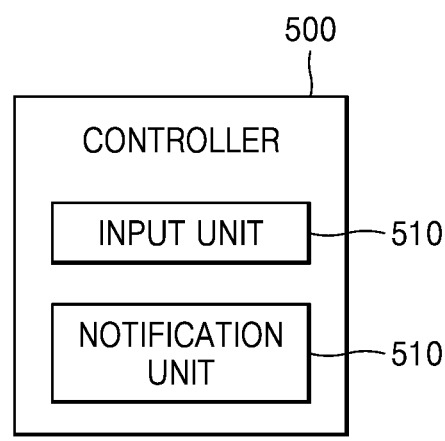
FIG. 14 is a schematic block diagram of a controller in the specialized vehicle of FIG. 1.

More specifically, at least one of the components, elements, modules or units of the cruise control system 500 in FIG. 14 may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

Hereinafter, the operation of the suspension apparatus 100 will be described in detail.

Figure 4:
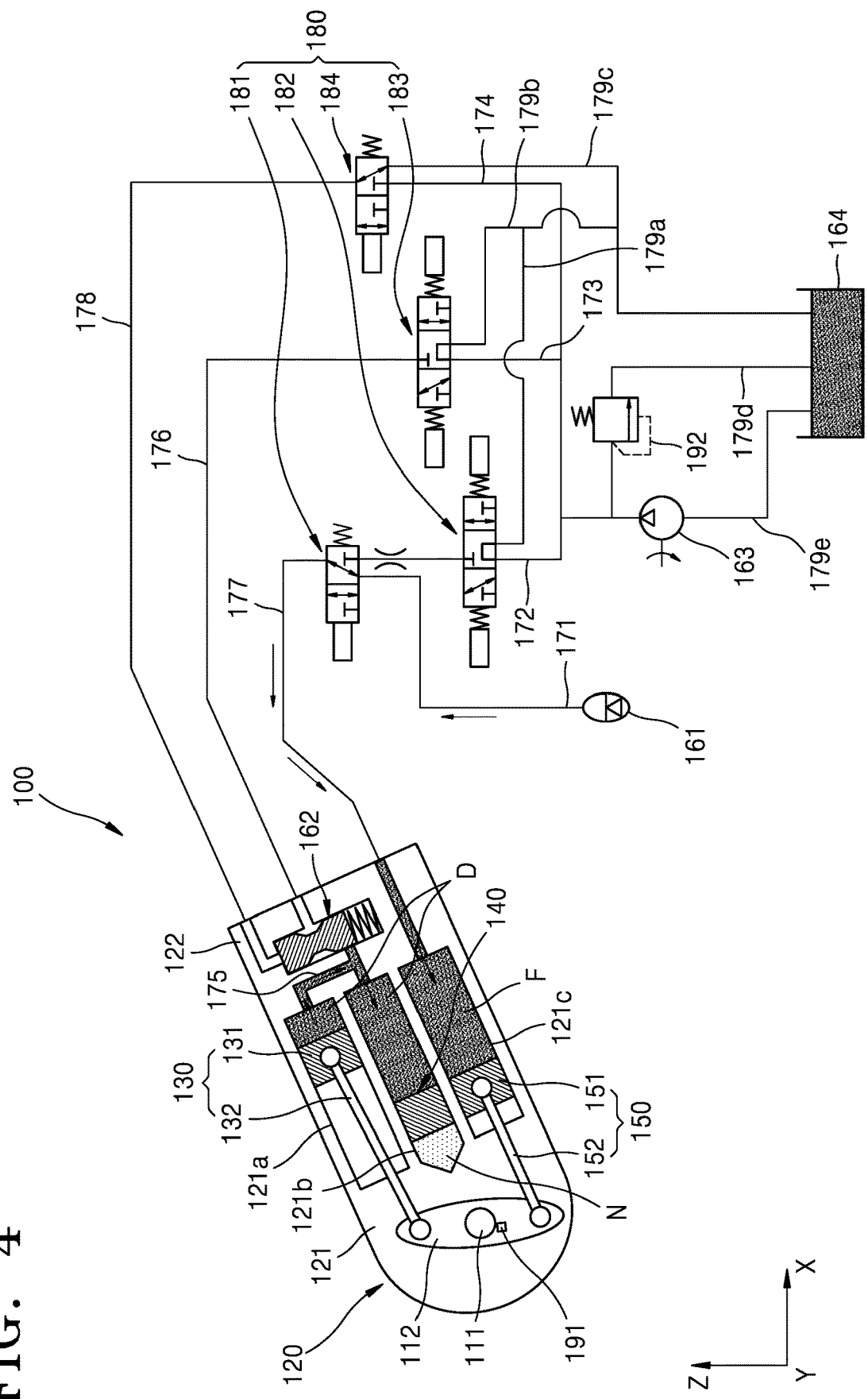
FIG. 4 is an operational view illustrating an operation of the suspension apparatus of FIG. 2.
Figure 5:
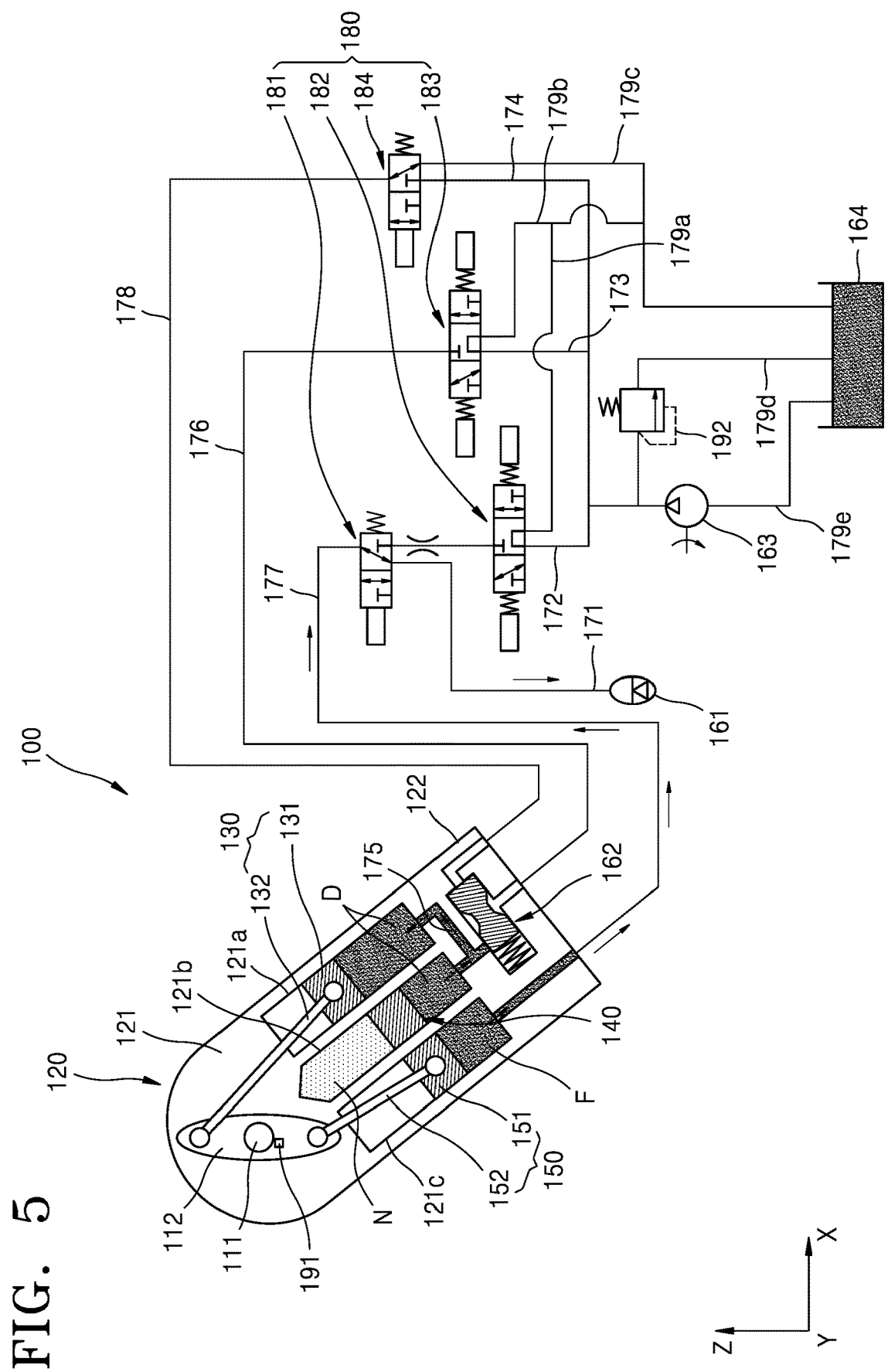
FIG. 5 is an operational view illustrating an operation of the suspension apparatus of FIG. 2.
Figure 6:
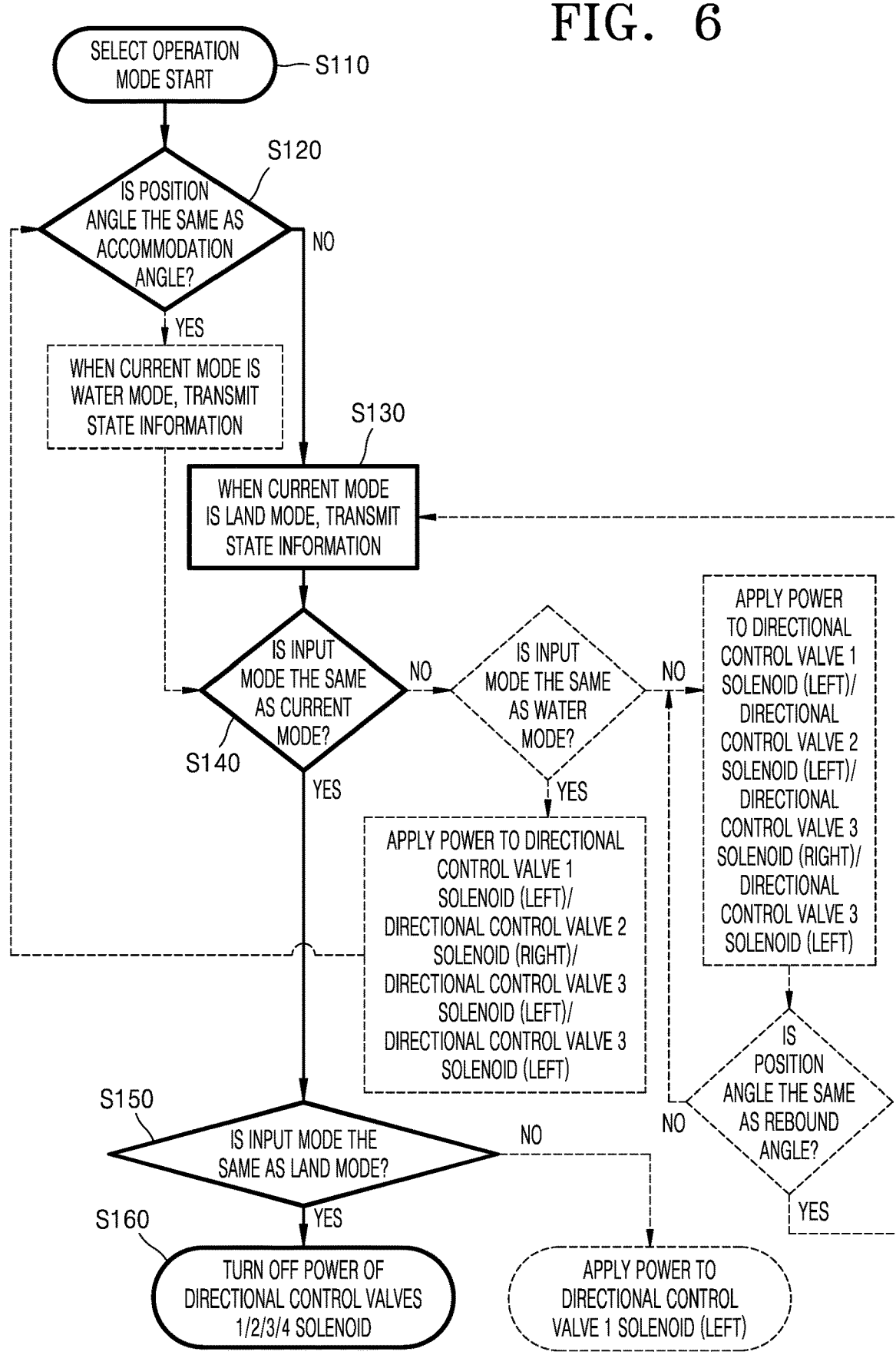
FIG. 6 is a flowchart sequentially illustrating the operations of the suspension apparatus, illustrated in FIGS. 4 and 5.

FIG. 4 is an operational view illustrating an operation of the suspension apparatus 100 of FIG. 2. FIG. 5 is an operational view illustrating an operation of the suspension apparatus 100 of FIG. 2. FIG. 6 is a flowchart sequentially illustrating the operation of the suspension apparatus 100, illustrated in FIGS. 4 and 5.

Referring to FIGS. 4 to 6, when the specialized vehicle (shown in FIG. 1) operates on the ground, the suspension apparatus 100 may supply a damping force to the specialized vehicle according to movement of the specialized vehicle.

In particular, the specialized vehicle may include an input unit 510 configured to receive an input to operate the specialized vehicle in a land mode or a water mode according to whether the specialized vehicle is to be operated on the ground or on water. In this regard, the land mode may be a mode in which the specialized vehicle travels on the ground (or on land), and the water mode may be a mode in which the specialized vehicle travels on water (or on a water surface). An operator of the specialized vehicle may select one of the drive modes (i.e., the land mode or the water mode) of the specialized vehicle and may select and input the selected drive mode as an input mode via the input unit 510 (operation S110). At this time, the controller 500 may compare the position angle of the housing 120 measured by the angle sensor 191 with a predetermined angle (operation S120). The controller 500 may determine whether the position angle is the same as an accommodation angle, which is the predetermined angle. In this case, the accommodation angle may be an angle at which the suspension apparatus 100 is accommodated inside the specialized vehicle and the specialized vehicle is operable in a water mode.

When it is determined that the position angle is different from the accommodation angle or the position angle is less than the accommodation angle, the controller 500 may determine that the current mode is a land mode and transmit this information to a notification unit 520 which notifies an external user or an operator of the information (operation S120). At this time, the notification unit 520 may notify the external user/operator of the information via a sound, an image, a light, or the like.

The controller 500 may determine whether the input mode input via the input unit 510 is the same as the current mode (operation S140). At this time, when the controller 500 determines that the input mode is not the same as the current mode, the controller 500 may determine whether the input mode is a water mode and perform separate additional operations.

When it is determined that the input mode is the same as the current mode, the controller 500 may determine whether the input mode input via the input unit 510 is a land mode (operation S150). When it is determined that the input mode input via the input unit 510 is a land mode, the controller 500 may control the first, second, third and fourth directional control valves 181, 182, 183 and 184 (operation S160).

More specifically, the controller 500 may turn off the power of the first directional control valve 181 so that the second transfer flow channel 177 is connected to the first flow channel 171 via the first directional control valve 181. In this state, the accumulator 161 may be connected to the rotational force applier 150 and configured to adjust a fluid inside the rotational force applier 150 according to a state of the rotational force applier 150. At this time, the accumulator 161 may supply a required fluid to the rotational force applier 150 or temporarily store a fluid discharged to the outside, according to a relative movement of the third piston 151 and the main housing 121 instead of applying a force to the third piston 151.

The controller 500 may control the second directional control valve 182 to connect the first branch flow channel 172 to the first return flow channel 179a. In this scenario, a fluid may not move from the second directional control valve 182 to the first directional control valve 181.

The controller 500 may control the third directional control valve 183 to connect the second branch flow channel 173 to the second return flow channel 179b, and may control the fourth directional control valve 184 to connect the supply flow channel 178 to the third return flow channel 179c. Here, the spool valve 162 may not operate, and the spool valve 162 may prevent connection between the connecting flow channel 175 and the first transfer flow channel 176. The connecting flow channel 175 arranged in the fluid manifold 122 may be blocked from the outside so that the first space 121a and the second space 121b can be maintained in a connected state.

For the above-described operation, the controller 500 may turn off the power of the first, second, third and fourth directional control valves 181, 182, 183 and 184.

As described above, when the first, second, third and fourth directional control valves 181, 182, 183 and 184 are controlled, the rotational force applier 150 may be connected to the accumulator 161, and the first damping portion 130 and the second damping portion 140 may be connected to each other. At this time, in a case in which when the specialized vehicle operates, the specialized vehicle receives a ground reaction force from the ground, such as a curved ground surface, foreign objects on the ground, or the like, the suspension apparatus 100 may provide damping for the specialized vehicle. The ground reaction force may be generated when the caterpillar track 20 of the specialized vehicle 1 comes into contact with the ground.

In particular, when the ground reaction force is applied as described above, via the connecting flow channel 175, the damping fluid D in the first space 121a may move to the second space 121b or the damping fluid D in the second space 121b may move to the first space 121a. In this case, nitrogen gas N accommodated in the second space 121b may be contracted or expanded, thereby generating a damping force. In addition, the damping fluid D may be contracted or expanded to move the first piston 131 of the first space 121a and the second damping portion 140 of the second space 121b, thereby providing a damping force.

By providing a damping force as described above, the main housing 121 may partially absorb the ground reaction force through slight rotation of the main housing 121.

When the main housing 121 rotates as described above, the main housing 121 and the third piston 151 may perform a relative motion as the third piston 151 moves linearly along the third space 121c. At this time, the second conrod 152 may be rotatably connected to the third piston 151, and thus may not interfere with the movement of the third piston 151. Based on the movement, a volume formed by a surface of the third piston 151 and the third space 121c may vary. For example, the volume formed by a surface of the third piston 151 and the third space 121c may be decreased or increased. The working fluid F accommodated in the third space 121c may be discharged to the outside by the reduced volume or may be supplied from the outside by the increased volume. At this time, the controller 500 may supply the working fluid F to the third space 121c via the accumulator 161 or may temporarily store the working fluid F discharged from the third space 121c.

The above-described operation may be continuously repeated when the specialized vehicle operates on land. The controller 500 may continuously monitor whether the input mode input via the input unit 510 is changed.

Thus, because the suspension apparatus 100 provides damping for the specialized vehicle while the specialized vehicle travels in a land mode, the specialized vehicle may exhibit enhanced riding comfort. In addition, because the suspension apparatus 100 partially absorbs the ground reaction force while the specialized vehicle travels in a land mode, the occurrence of vibration in the specialized vehicle or transmission of an external force to the specialized vehicle 1 may be prevented.

Figure 7:
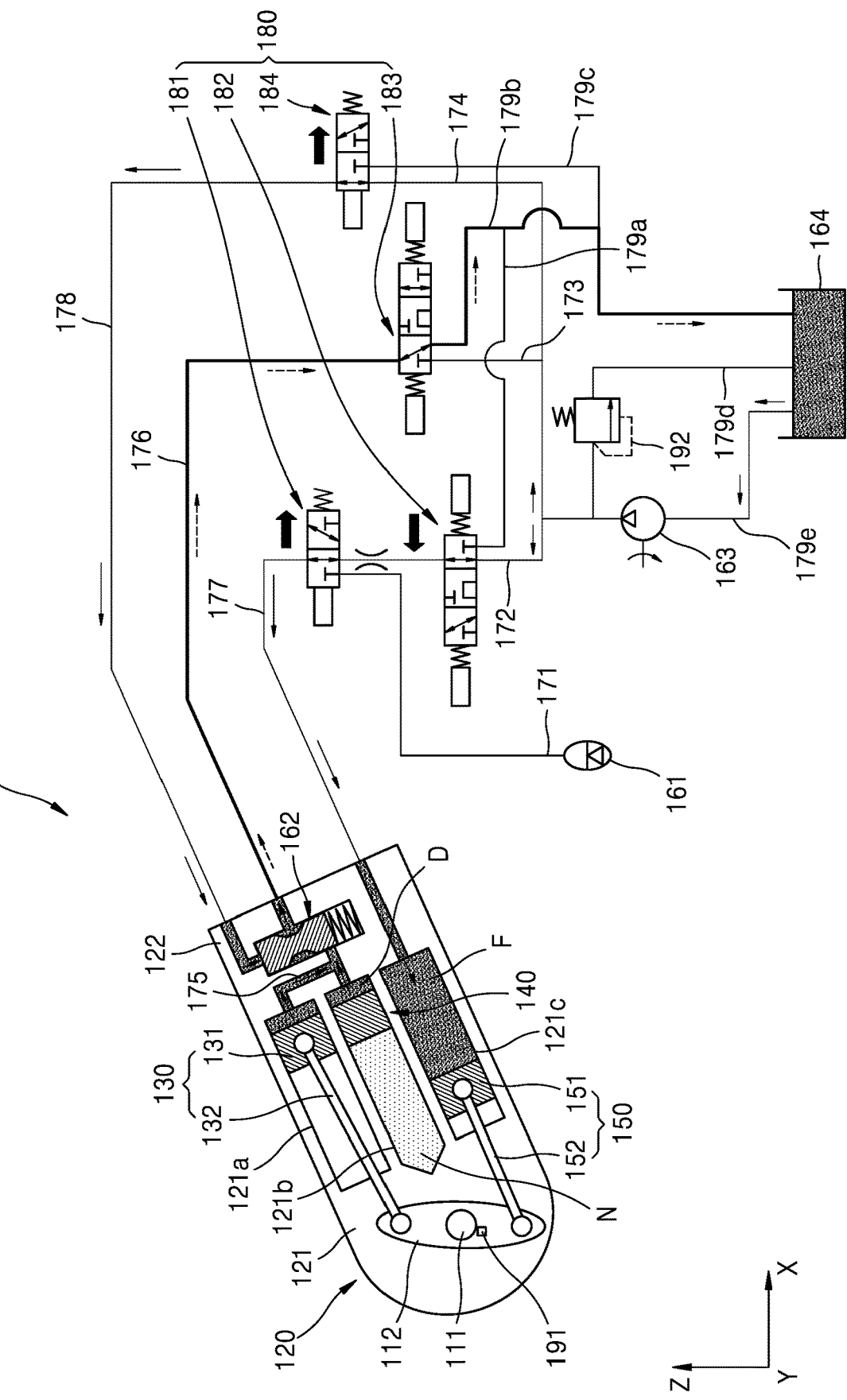
FIG. 7 is an operational view illustrating an operation of the suspension apparatus of FIG. 2.
Figure 8:
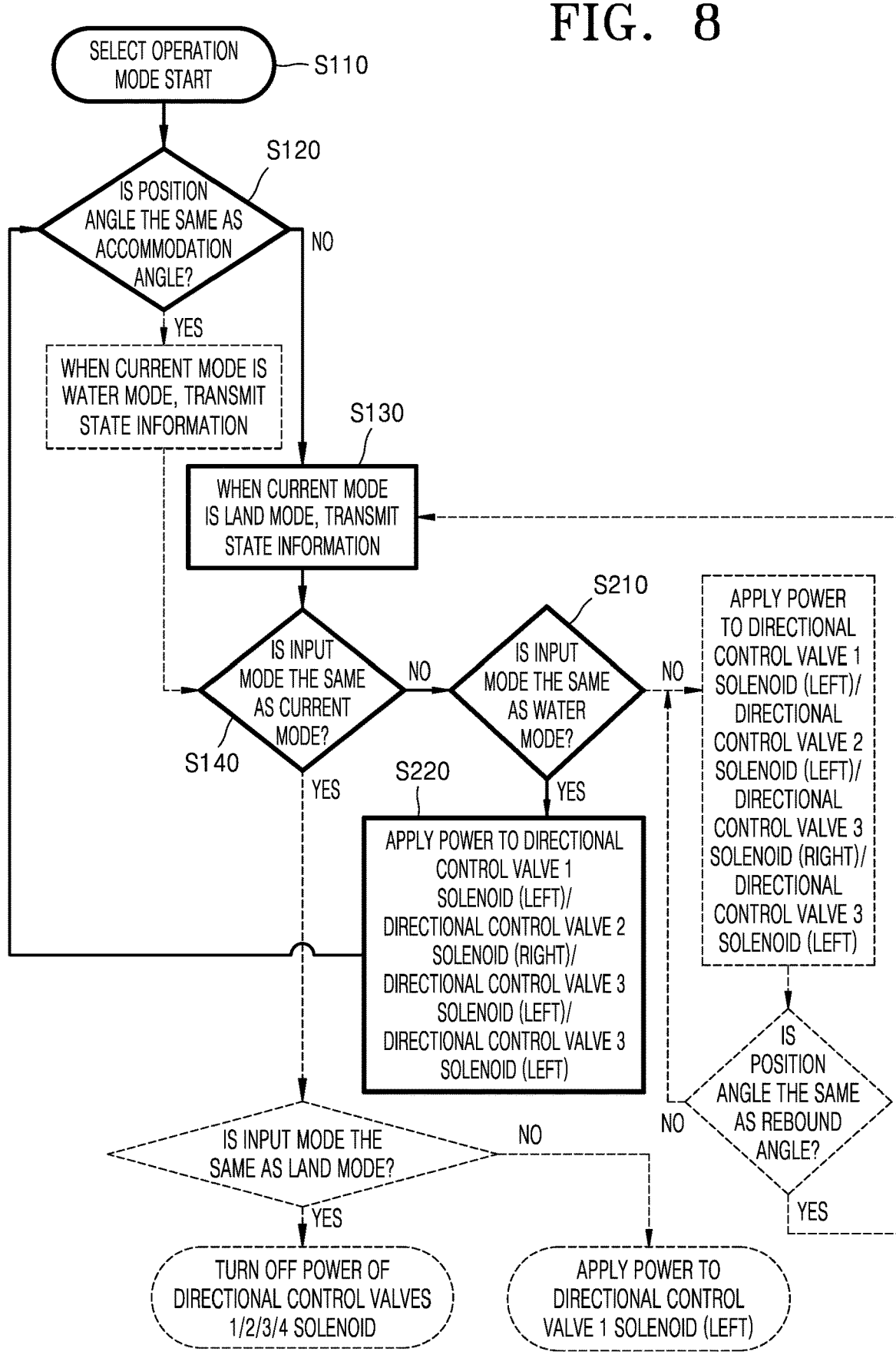
FIG. 8 is a flowchart sequentially illustrating the operation of the suspension apparatus, illustrated in FIG. 7.

FIG. 7 is an operational view illustrating an operation of the suspension apparatus 100 of FIG. 2. FIG. 8 is a flowchart sequentially illustrating the operation of the suspension apparatus 100, illustrated in FIG. 7.

Referring to FIGS. 7 and 8, when the specialized vehicle 1 (FIG. 1) enters a water mode from a land mode, a controller 500 may control the suspension apparatus 100. In this case, an operator of the specialized vehicle 1 may input a water mode via an input unit 510 (operation S110).

In particular, the controller 500 may determine whether a position angle of the main housing 121, which is measured by the angle sensor 191, is the same as or greater than an accommodation angle. At this time, when it is determined that the position angle of the main housing 121 is less than the accommodation angle, the controller 500 may determine that the current mode is a land mode and notify the land mode to the outside via a notification unit 520.

Subsequently, the controller 500 may determine whether an input mode input via the input unit 510 is the same as the current mode (operation S140). At this time, when it is determined that the input mode is the same as the current mode, the controller 500 may determine whether the input mode is a land mode. When it is determined that the input mode is the land mode, the controller 500 may control the suspension apparatus 100 as described above with reference to FIGS. 4 to 6. However, as described above, because the mode input via the input unit 510 is a water mode, the controller 500 may determine that the current mode is different from the input mode.

When it is determined that the current mode is different from the input mode, the controller 500 may determine whether the input mode is a water mode (operation S210). When the input mode is the water mode, the controller 500 may apply power to the first, second, third and fourth directional control valves 181, 182, 183 and 184 (operation S220).

In particular, when power is applied to the first directional control valve 181, the first directional control valve 181 may connect the second transfer flow channel 177 to the first branch flow channel 172 (FIG. 7). In addition, the second directional control valve 182 may open the first branch flow channel 172. The third directional control valve 183 may connect the first transfer flow channel 176 to the second return flow channel 179b. The fourth directional control valve 184 may connect the supply flow channel 178 to the third branch flow channel 174.

As described above, after the first, second, third and fourth directional control valves 181, 182, 183 and 184 are controlled, the controller 500 may operate the pump 163 to supply a fluid. The supplied fluid may be supplied to the second transfer flow channel 177 along the first branch flow channel 172 to enter the third space 121c. In addition, the supplied fluid may be supplied to the supply flow channel 178 via the third branch flow channel 174 to operate the spool valve 162. At this time, the damping fluid D accommodated in the first space 121a and the second space 121b may be transferred to the fluid storage portion 164 along the connecting flow channel 175 via the first transfer flow channel 176 and the second return flow channel 179b. In addition, the first piston 131 rotatably connected to the first conrod 132 may rotate about a portion thereof connected to the first conrod 132 according to rotation of the main housing 121. In this case, the first space 121a, in which the damping fluid D is accommodated, may be reduced. The second damping portion 140 may freely move in the second space 121b when the damping fluid D is discharged from the second space 121b.

As described above, when the spool valve 162 operates, the spool valve 162 may connect the connecting flow channel 175 to the first transfer flow channel 176. In this case, the damping fluid D accommodated in the first space 121a and the second space 121b may be transferred to the second return flow channel 179b to the fluid storage portion 164 along the connecting flow channel 175 and the first transfer flow channel 176.

In addition, a fluid supplied to the third space 121c according to operation of the pump 163 may rotate the main housing 121. For example, the fluid supplied to the third space 121c may increase the fluid included in the third piston 151 and the third space 121c, thereby rotating the main housing 121 counterclockwise with respect to FIG. 7. At this time, the third piston 151 may be rotatably connected to the second conrod 152 to be freely rotatable. In this case, the main housing 121 may rotate about the crankshaft 111 and the pivot member 112 to be accommodated in the specialized vehicle. At this time, the crankshaft 111 and the pivot member 112 may be fixed to a vehicle body (not shown).

After the above-described operation, the controller 500 may determine again whether the position angle of the main housing 121 is less than the accommodation angle and, when the position angle is less than the accommodation angle, may continuously perform the above-described process.

Meanwhile, when the position angle exceeds the accommodation angle, this is determined as a water mode and as described below, the position of the suspension apparatus 100 may be maintained.

Accordingly, the suspension apparatus 100 may be accommodated in the specialized vehicle through a simple structure. In particular, the suspension apparatus 100 does not need to include a separate motor or the like, and thus the size and location place thereof may be minimized. In addition, the suspension apparatus 100 may be accommodated in the specialized vehicle even in the absence of a ground reaction force.

Figure 9:
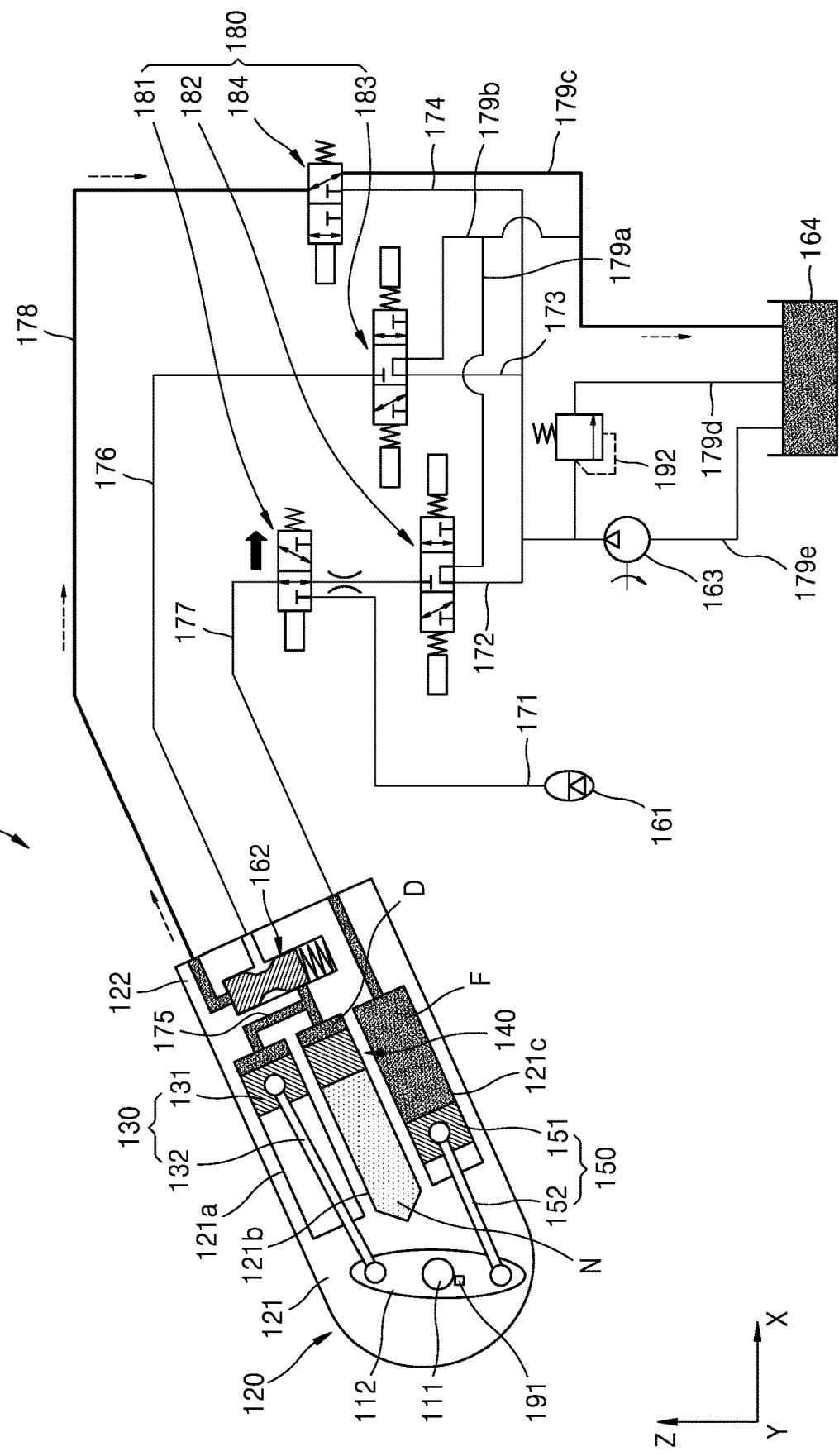
FIG. 9 is an operational view illustrating the operation of the suspension apparatus, illustrated in FIG. 7.
Figure 10:
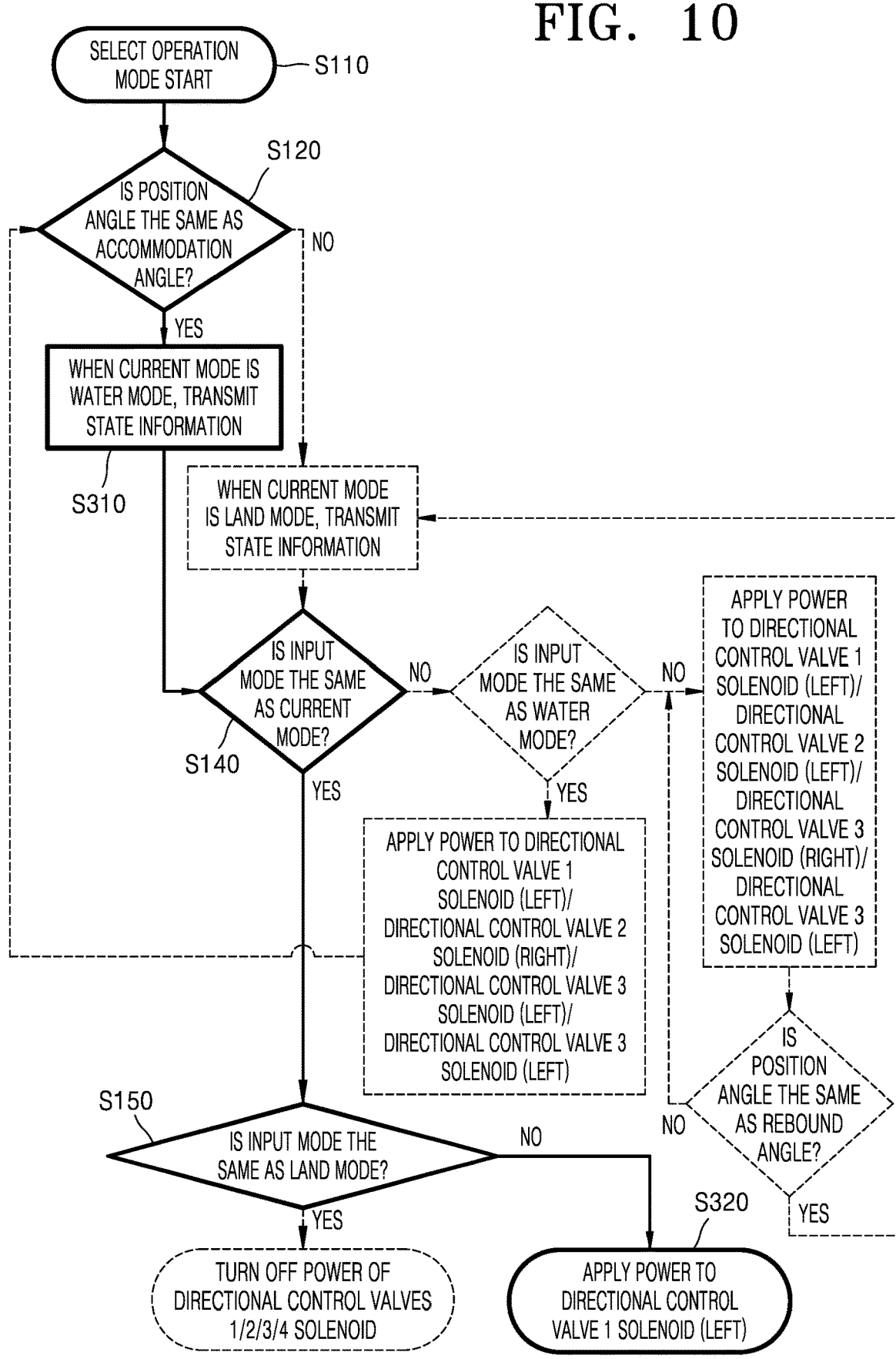
FIG. 10 is a flowchart sequentially illustrating the operation of the suspension apparatus, illustrated in FIG. 9.

FIG. 9 is an operational view illustrating an operation of the suspension apparatus 100 of FIG. 2. FIG. 10 is a flowchart sequentially illustrating the operation of the suspension apparatus 100, illustrated in FIG. 9.

Referring to FIGS. 9 and 10, after the suspension apparatus 100 enters the water mode from the land mode as described above, a specialized vehicle 1 (FIG. 1) may travel on water. At this time, after the suspension apparatus 100 enters the water mode, the state of the suspension apparatus 100 may be maintained.

In particular, the controller 500 may determine whether an input mode is input via an input unit 510 (operation S110). The controller 500 may determine whether a position angle of the main housing 121, which is measured by the angle sensor 191, is less than an accommodation angle (operation S120). When it is determined that the position angle exceeds the accommodation angle, the controller 500 may notify the information indicating that the current mode is a water mode, to the outside via a notification unit 520 (operation S310).

Subsequently, the controller 500 may determine whether an input mode input via an input unit 510 is the same as the current mode. When it is determined that the input mode is different from the current mode, the controller 500 may perform a control operation in the same manner as described above with reference to FIGS. 7 and 8. Meanwhile, when it is determined that the input mode is the same as the current mode, the controller 500 may determine whether the input mode is a land mode (operation S150).

When it is determined that the input mode is a land mode, the controller 500 may control the suspension apparatus 100 in the same manner as described above with reference to FIGS. 4 to 6. Meanwhile, when it is determined that the input mode is not a land mode, the controller 500 may control the first directional control valve 181 to prevent connection between the second transfer flow channel 177 and the first branch flow channel 172. In addition, the controller 500 may control the second directional control valve 182 to connect the first branch flow channel 172 to the first return flow channel 179a, and may control the third directional control valve 183 to connect the second branch flow channel 173 to the second return flow channel 179b. The controller 500 may control the fourth directional control valve 184 to connect the supply flow channel 178 to the third return flow channel 179c (operation S320).

In this case, the second transfer flow channel 177 may be kept blocked from the outside. In addition, because the first transfer flow channel 176 is also blocked from the outside, the damping fluid D in the first space 121a and the second space 121b may no longer be discharged to the outside. The fluid of the supply flow channel 178 may return to the fluid storage portion 164 via the supply flow channel 178 and the third return flow channel 179c as the spool valve 162 returns again.

In this case, the state of the suspension apparatus 100 may be maintained. That is, the suspension apparatus 100 may be maintained in a state of being accommodated in the specialized vehicle.

Thus, the suspension apparatus 100 may be maintained in an accommodated state through a simple manipulation without a separate instrument. In addition, the suspension apparatus 100 may be maintained in an accommodated state through the component included therein.

Figure 11:
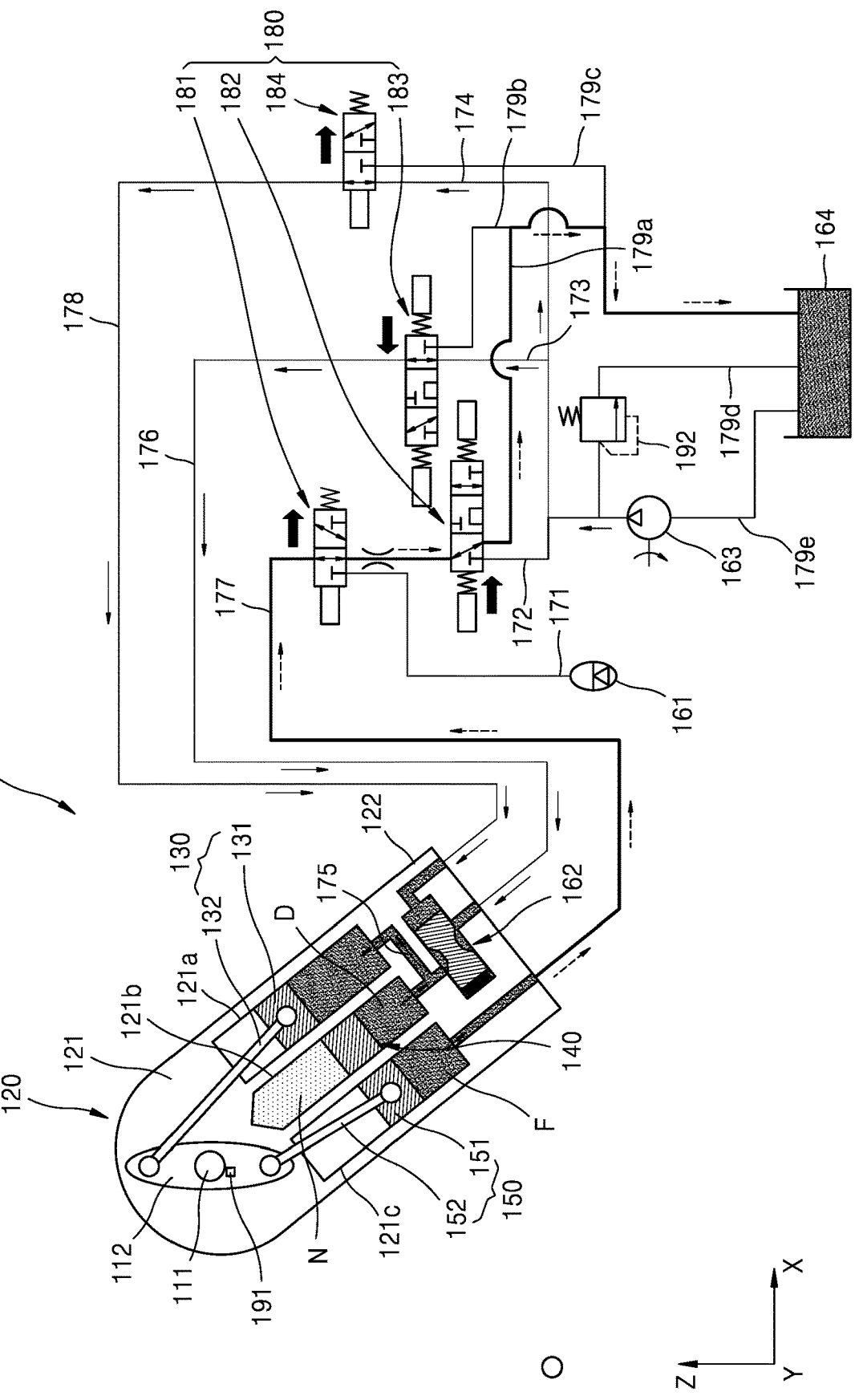
FIG. 11 is an operational view illustrating an operation of the suspension apparatus of FIG. 2.
Figure 12:
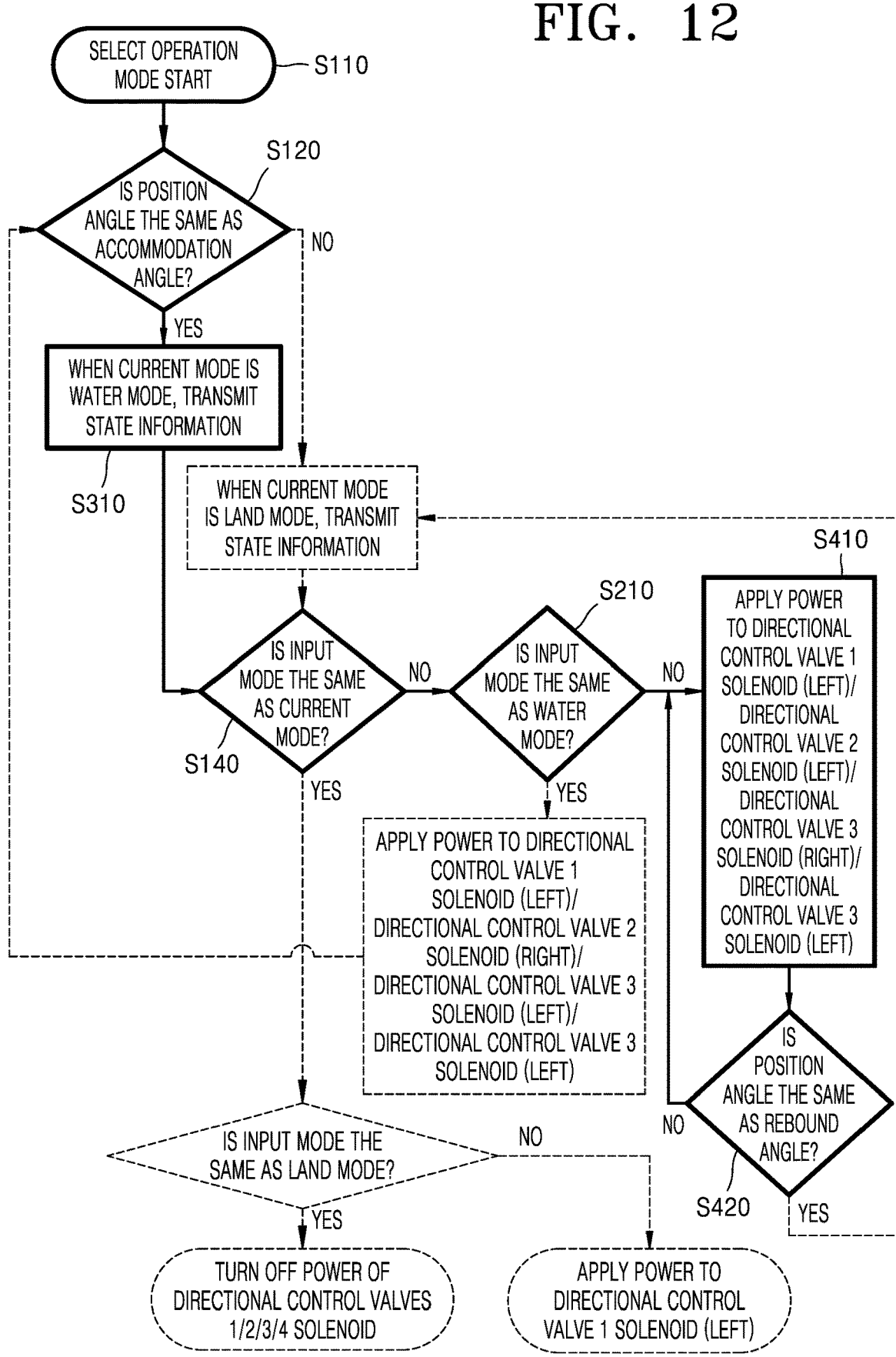
FIG. 12 is a flowchart sequentially illustrating the operation of the suspension apparatus, illustrated in FIG. 11.

FIG. 11 is an operational view illustrating an operation of the suspension apparatus 100 of FIG. 2. FIG. 12 is a flowchart sequentially illustrating the operation of the suspension apparatus 100, illustrated in FIG. 11.

Referring to FIGS. 11 and 12, the suspension apparatus 100 may proceed in a water mode and then be converted into a land mode according to the traveling of a specialized vehicle (not shown). In this case, a user may input the land mode as an input mode via an input unit 510 (operation S110). In this case, the controller 500 may compare a position angle of the main housing 121, which is measured by the angle sensor 191, with an accommodation angle (operation S120). When the position angle is equal to or greater than the accommodation angle, the controller 500 may transmit the information indicating that the current mode is a water mode to the outside via a notification unit 520 (operation S310).

The controller 500 may determine whether the input mode input via the input unit 510 is the same as the current mode (operation S140).

Because the current mode is different from the input mode, the controller 500 may determine whether the input mode is a water mode (operation S210). At this time, because the input mode is not a water mode, the controller 500 may control the first, second, third and fourth directional control valves 181, 182, 183 and 184 (operation S410).

In particular, the controller 500 may control the first directional control valve 181 to connect the second transfer flow channel 177 to the first branch flow channel 172. The controller 500 may control the second directional control valve 182 to connect the first branch flow channel 172, which connects the first directional control valve 181 and the second directional control valve 182, to the first return flow channel 179a. The controller 500 may control the third directional control valve 183 to connect the first transfer flow channel 176 to the second branch flow channel 173. The controller 500 may control the fourth directional control valve 184 to connect the supply flow channel 178 to the third branch flow channel 174.

In this case, the controller 500 may operate the pump 163. At this time, the fluid of the fluid storage portion 164 may be supplied to the second branch flow channel 173 and the third branch flow channel 174 according to operation of the pump 163. At this time, the first branch flow channel 172 may be blocked by the second directional control valve 182.

In this case, the fluid may be supplied to the supply flow channel 178 via the third branch flow channel 174. The fluid supplied to the supply flow channel 178 may operate the spool valve 162 and the connecting flow channel 175 may be connected to the first transfer flow channel 176 according to the operation of the spool valve 162. In addition, the fluid supplied to the second branch flow channel 173 may be supplied to the connecting flow channel 175 via the first transfer flow channel 176 to enter the first space 121a and the second space 121b. The first piston 131 and the second damping portion 140 may be arranged in the same or different forms as described above with reference to FIG. 4. That is, the main housing 121 may be rotatable clockwise with respect to FIG. 11.

When the main housing 121 rotates as described above, the volume of a space formed by the third space 121c and the third piston 151 may be reduced, and the fluid may be discharged to the outside via the second transfer flow channel 177 by the reduced volume. At this time, the fluid flowing through the second transfer flow channel 177 may be accommodated in the fluid storage portion 164 via the first return flow channel 179a.

When the above-described process is completed, the controller 500 may determine whether the position angle of the main housing 121 is a rebound angle. At this time, the rebound angle may be a range in which the position angle of the main housing 121 varies according to damping of the suspension apparatus 100 (operation S420).

As described above, when it is determined that the position angle of the main housing 121 is outside the rebound angle, the controller 500 may continuously perform the above-described control operation.

Meanwhile, when it is determined that the position angle of the main housing 121 is within the rebound angle, the controller 500 may notify the information indicating that the current mode is a land mode to the outside via the notification unit 520.

Subsequently, the controller 500 may perform the control operation as described above with reference to FIGS. 4 to 6.

In particular, the controller 500 may turn off the power of the first directional control valve 181 to connect the accumulator 161 to the second transfer flow channel 177, and may turn off the power of the second directional control valve 182 to connect the first branch flow channel 172 to the first return flow channel 179a. In addition, the controller 500 may turn off the power of the third directional control valve 183 to connect the second branch flow channel 173 to the second return flow channel 179b, and may turn off the power of the fourth directional control valve 184 to connect the supply flow channel 178 to the third return flow channel 179c.

In this case, due to return of the spool valve 162, the fluid of the supply flow channel 178 may be stored in the fluid storage portion 164 via the third return flow channel 179c. In addition, the connecting flow channel 175 and the first transfer flow channel 176 may be blocked from each other, and the first transfer flow channel 176 may be completely blocked from the outside.

Thus, the suspension apparatus 100 may freely switch between the land mode and the water mode. In addition, because the suspension apparatus 100 does not have a separate structure configured to accommodate the suspension apparatus 100, the volume of the suspension apparatus 100 itself may be minimized.

Figure 13:
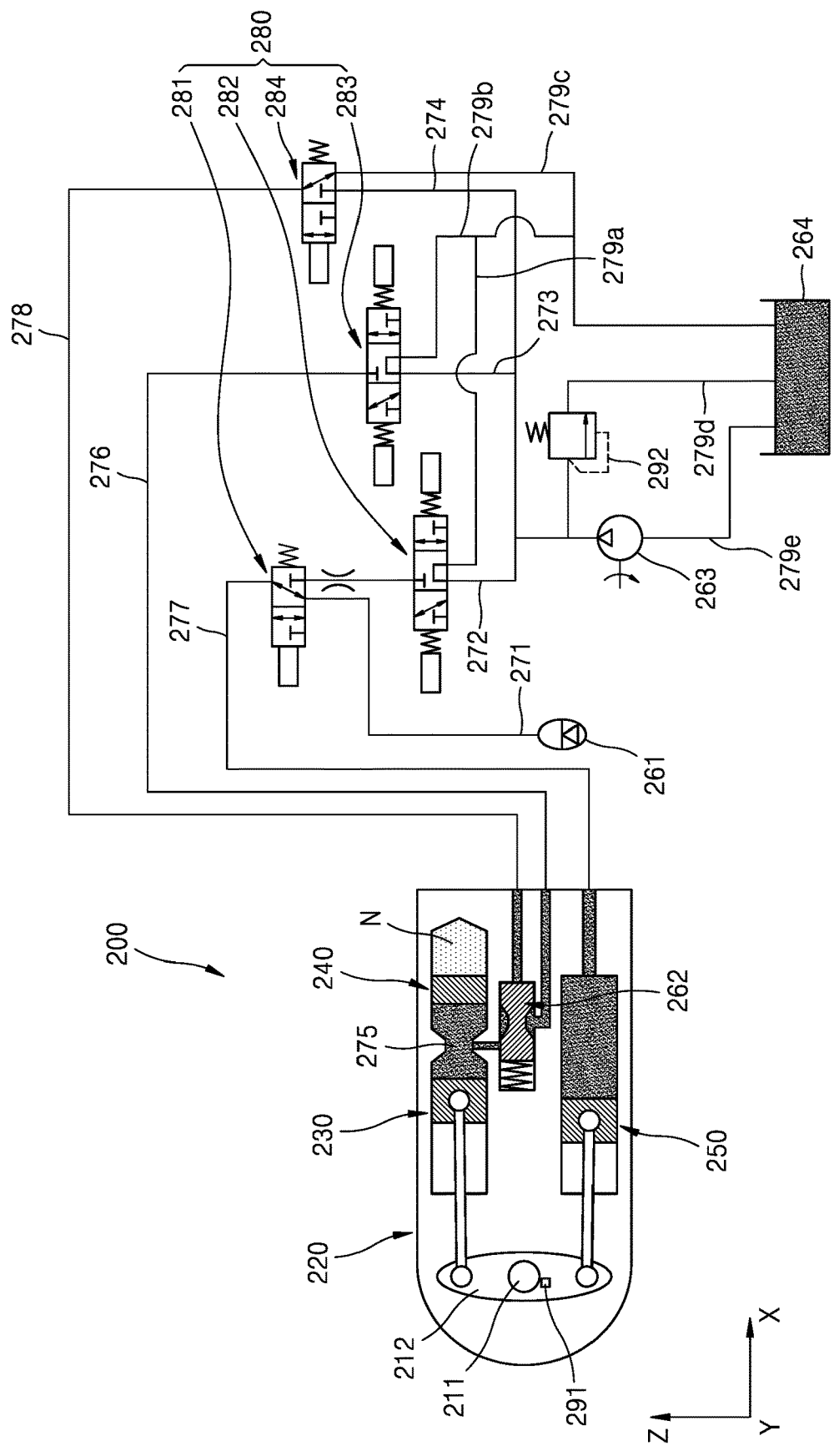
FIG. 13 is a conceptual view illustrating a suspension apparatus of the specialized vehicle of FIG. 1, according to an exemplary embodiment.

FIG. 13 is a conceptual view illustrating a suspension apparatus 200 of the specialized vehicle of FIG. 1, according to an exemplary embodiment.

Referring to FIG. 13, the suspension apparatus 200 may include a crankshaft 211, a pivot member 212, a housing 220, a first damping portion 230, a second damping portion 240, a rotational force applier 250, an accumulator 261, a spool valve 262, a pump 263, a fluid storage portion 264, a directional control valve 280, an angle sensor 291, and a bypass valve 292. In this regard, the crankshaft 211, the pivot member 212, the housing 220, the first damping portion 230, the rotational force applier 250, the accumulator 261, the spool valve 262, the pump 263, the fluid storage portion 264, the directional control valve 280, the angle sensor 291, and the bypass valve 292 are the same as or similar to those described above, and thus a detailed description thereof will be omitted herein.

In addition, a first transfer flow channel 276, a second transfer flow channel 277, a supply flow channel 278, a first branch flow channel 272, a second branch flow channel 273, a third branch flow channel 274, a first return flow channel 279a, a second return flow channel 279b, a third return flow channel 279c, and a bypass flow channel 279d are the same as or similar to those described above, and thus a detailed description thereof will be omitted herein.

The second damping portion 240 may be configured such that the second damping portion 240 faces the first damping portion 230. Here, a connecting flow channel 275, which connects the first damping portion 230 to the second damping portion 240, may be in the form of a straight line. At this time, the connecting flow channel 275 may be connected to the first transfer flow channel 276, and the spool valve 262 may be arranged at the connecting flow channel 275 to selectively block the first transfer flow channel 276.

Meanwhile, the suspension apparatus 200 may be controlled in the same manner as described above with reference to FIGS. 4 and 6 when the suspension apparatus 200 operates in a land mode as described above. When the land mode is switched to the water mode, the suspension apparatus 200 may be controlled as described above with reference to FIGS. 7 and 8. When the suspension apparatus 200 is maintained in the water mode, the suspension apparatus 200 may be controlled as described above with reference to FIGS. 9 and 10. In addition, when the water mode is switched to the land mode, the suspension apparatus 200 may be controlled as described above with reference to FIGS. 11 and 12.

Thus, the suspension apparatus 200 may freely switch between the land mode and the water mode. In addition, because the suspension apparatus 200 does not have a separate structure configured to accommodate the suspension apparatus 200, the volume of the suspension apparatus 200 itself may be minimized.

According to exemplary embodiments of the present disclosure, it is possible to accommodate or deploy a suspension apparatus even in a case in which no ground reaction force acts. According to exemplary embodiments of the present disclosure, it is possible to accommodate or deploy a suspension apparatus through a simple structure.

Although the present disclosure has been described with reference to the aforementioned exemplary embodiments, various changes or modifications can be made without departing from the spirit and scope of the present disclosure. Thus, these changes or modification within the scope of the present disclosure will fall within the scope of the appended claims.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While exemplary embodiments have been described above, it will be understood by those of ordinary skill in the art that various changes in form and details may be made therein without departing from the spirit and scope of the disclosure as defined by the following claims.

What is claimed is:

1. A suspension apparatus comprising:
   a crankshaft fixed to a vehicle body;
   a housing rotatably connected to the crankshaft;
   a first damping portion arranged in the housing and having a damping fluid accommodated in the first damping portion, an amount of the damping fluid in the first damping portion being adjusted according to an external force applied to the vehicle body;
   a second damping portion arranged in the housing, connected to the first damping portion such that the damping fluid moves between the first damping portion and the second damping portion, and comprising:
   a first space accommodating a compressed gas; and
   a second space accommodating the damping fluid, the first space facing the second space;
   a rotational force applier arranged in the housing and configured to apply a rotational force to the housing by adjusting an amount of a working fluid in the rotational force applier; and
   a plurality of directional control valves that are each configured to change a flow path of the damping fluid to or from the housing.

2. The suspension apparatus of claim 1, further comprising an accumulator connected to the rotational force applier and configured to adjust the amount of the working fluid in the rotational force applier.

3. The suspension apparatus of claim 2, further comprising a spool valve arranged in the housing, connected to the first damping portion and the second damping portion, and configured to selectively block the damping fluid from being discharged to or supplied from an exterior of the housing.

4. The suspension apparatus of claim 3, further comprising a pump configured to supply a fluid to at least one of the first damping portion, the second damping portion, the rotational force applier, and the spool valve.

5. The suspension apparatus of claim 4, further comprising a fluid storage portion connected to at least one of the pump, the first damping portion, the second damping portion, the rotational force applier, and the spool valve, and configured to store the fluid.

6. The suspension apparatus of claim 5, wherein the plurality of directional control valves comprises:
a first directional control valve configured to selectively connect the rotational force applier to the accumulator;
a second directional control valve configured to selectively connect the pump to one of the rotational force applier and the fluid storage portion;
a third directional control valve configured to selectively connect the pump to the first damping portion and the second damping portion or selectively connect the pump to the fluid storage portion; and
a fourth directional control valve configured to selectively connect the pump to one of the spool valve and the fluid storage portion.

7. A suspension apparatus comprising:
a crankshaft fixed to a vehicle body;
a housing rotatably connected to the crankshaft;
a first damping portion provided in the housing and comprising a space for accommodating a damping fluid, a size of the space accommodating the damping fluid being adjusted according to an external force applied to the vehicle body;
a second damping portion provided in the housing, the second damping portion being adjacent to the first damping portion, communicating with the first damping portion via a channel to share the damping fluid with the first damping portion, and comprising:
a first chamber accommodating a compressed gas; and
a second chamber accommodating the damping fluid, the first chamber and the second chamber facing each other;
a rotational force applier provided in the housing and configured to apply a rotational force to the housing by adjusting an amount of a working fluid in the rotational force applier; and
a plurality of directional control valves that are each configured to change a flow path of the damping fluid to or from the housing.

8. The suspension apparatus of claim 7, further comprising an accumulator connected to the rotational force applier and configured to adjust the amount of the working fluid in the rotational force applier.

9. The suspension apparatus of claim 7, further comprising a spool valve arranged in the housing, connected to the first damping portion and the second damping portion, and configured to selectively block the damping fluid from being discharged to or supplied from an exterior of the housing.

10. The suspension apparatus of claim 9, further comprising a pump configured to supply a fluid to at least one of the first damping portion, the second damping portion, the rotational force applier, and the spool valve.

11. The suspension apparatus of claim 10, further comprising a fluid storage portion connected to at least one of the pump, the first damping portion, the second damping portion, the rotational force applier, and the spool valve, and configured to store the fluid.

12. A specialized vehicle comprising:
a vehicle body;
a caterpillar track connected to the vehicle body, configured to move the vehicle body, and comprising:
at least one road wheel; and
a track surrounding the at least one road wheel; and
a suspension apparatus provided in the vehicle body and connected to the at least one road wheel,
wherein the suspension apparatus comprises:
a crankshaft fixed to the vehicle body;
a housing rotatably connected to the crankshaft;
a first damping portion provided in the housing and having a first space to accommodate a damping fluid in the first damping portion;
a second damping portion provided adjacent to the first damping portion in the housing, connected to the first damping portion to share the damping fluid with the first damping portion, and comprising:
a second space accommodating a compressed gas in the second damping portion; and
a third space accommodating the damping fluid in the second damping portion, an amount of the damping fluid in the first and second damping portions being adjusted according to an external force applied to the at least one road wheel;
a rotational force applier provided adjacent to the second damping portion in the housing and configured to apply a rotational force to the housing by adjusting an amount of a working fluid in the rotational force applier; and
a plurality of directional control valves that are each configured to change a flow path of the damping fluid to or from the housing.

13. The specialized vehicle of claim 12, wherein the suspension apparatus further comprising an accumulator connected to the rotational force applier and configured to adjust the amount of the working fluid in the rotational force applier.

14. The specialized vehicle of claim 13, wherein the suspension apparatus further comprises a spool valve arranged in the housing, connected to the first damping portion and the second damping portion, and configured to selectively block the damping fluid from being discharged to or supplied from an exterior of the housing.

15. The specialized vehicle of claim 14, wherein the suspension apparatus further comprises a pump configured to supply a fluid to at least one of the first damping portion, the second damping portion, the rotational force applier, and the spool valve.

16. The specialized vehicle of claim 15, wherein the suspension apparatus further comprises a fluid storage portion connected to at least one of the pump, the first damping portion, the second damping portion, the rotational force applier, and the spool valve and configured to store the fluid.

17. The specialized vehicle of claim 16, wherein the plurality of directional control valves comprises:
a first directional control valve configured to selectively connect the rotational force applier to the accumulator;
a second directional control valve configured to selectively connect the pump to one of the rotational force applier and the fluid storage portion;
a third directional control valve configured to selectively connect the pump to the first damping portion and the second damping portion or selectively connect the pump to the fluid storage portion; and
a fourth directional control valve configured to selectively connect the pump to one of the spool valve and the fluid storage portion.

18. The specialized vehicle of claim 17 further comprising a controller configured to control the first, second, third and fourth directional control valves based on a drive mode of the specialized vehicle.

19. The specialized vehicle of claim 18, wherein in response to the controller determining that the specialized vehicle is operating in a land mode, the controller is configured to turn off power of the first, second, third and fourth directional control valves, and wherein in response to the controller receiving an input to operate the specialized vehicle in a water mode while driving in the land mode, the controller is configured to apply power to the first, second, third and fourth directional control valves.

20. The specialized vehicle of claim 18, wherein in response to the controller receiving an input to operate the specialized vehicle in a land mode while driving in a water mode, the controller is configured to apply power to only the first directional control valve.

* * * * *